Aug. 21, 1945. E. W. SLICER 2,383,169
WINDSHIELD
Filed April 24, 1942 2 Sheets-Sheet 1
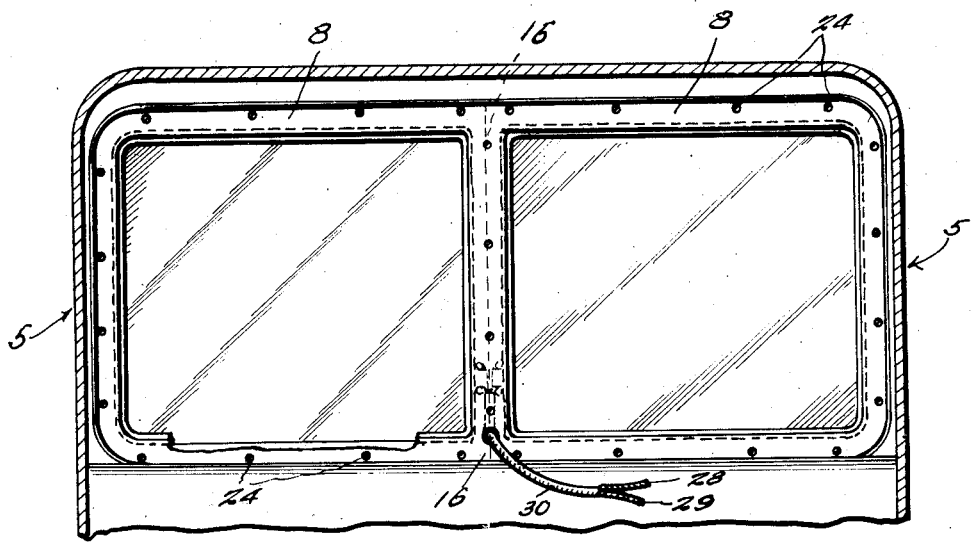
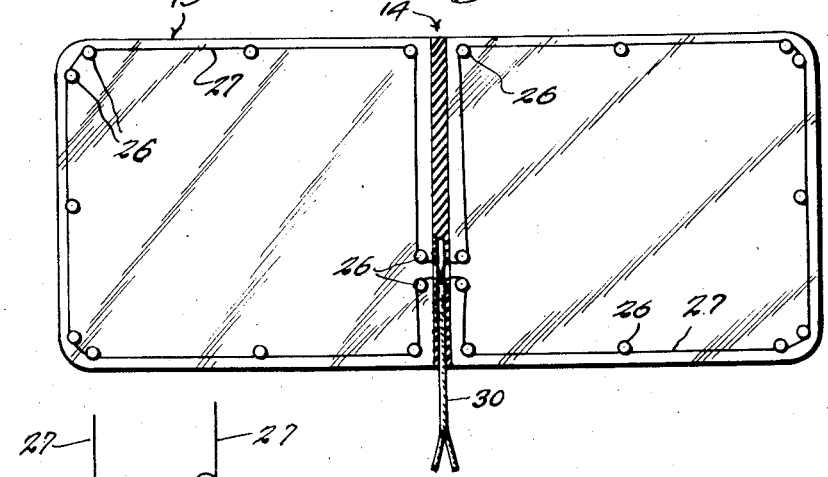
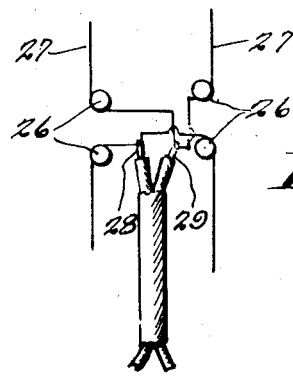
Inventor
Edward W. Slicer Aug. 21, 1945. E. W. SLICER 2,383,169
WINDSHIELD
Filed April 24, 1942 2 Sheets-Sheet 2
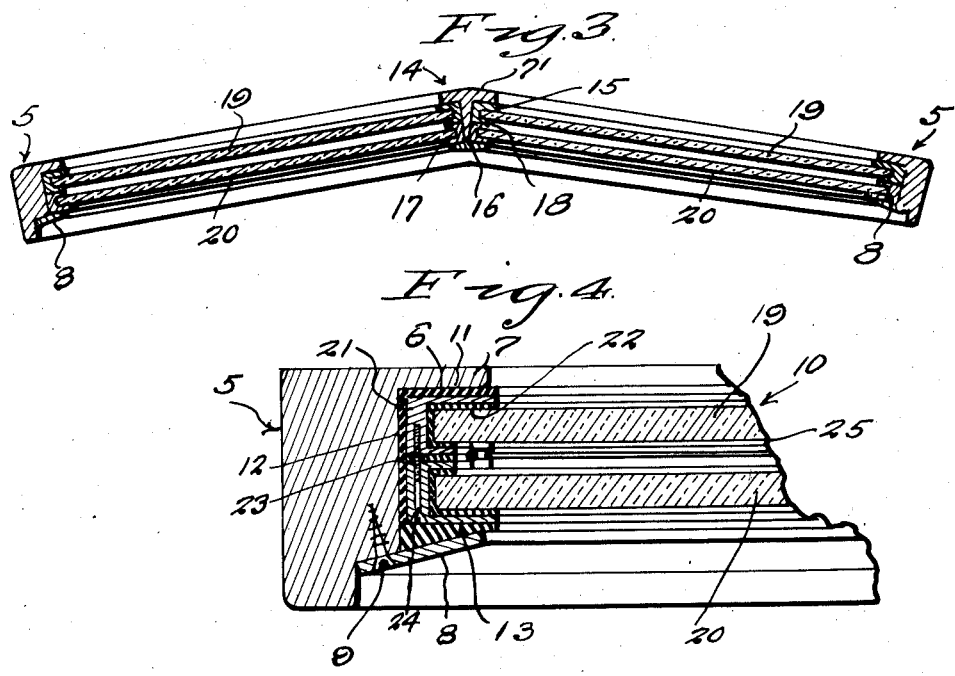
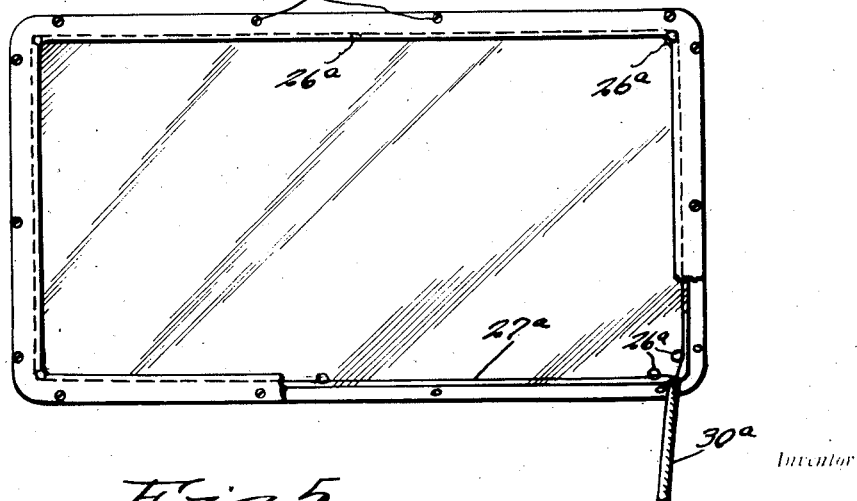
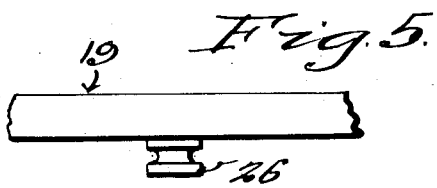
Inventor
Edward W. Slicer Patented Aug. 21, 1945

2,383,169

UNITED STATES PATENT OFFICE 2,383,169

WINDSHIELD

Edward W. Slicer, Colora, Md.

Application April 24, 1942, Serial No. 440,371

1 Claim. (Cl. 20—40.5)

The invention relates to improvements in windshields for vehicles, and the primary object of the invention is to provide a structure of this type adapted to installation in modern vehicles without substantial alteration of the original structure, the said windshields being formed with a double glass arrangement providing an air space between the glasses, whereby frosting and steaming of the windshields is substantially eliminated.

Other important objects and advantages of the invention will be apparent from a reading of the following description taken in connection with the appended drawings, wherein for purposes of illustration preferred embodiments of the invention are shown.

In the drawings:

Figure 1 is a general transverse vertical sectional view taken through the driving compartment of an automobile to the rear of the windshield thereof and showing an installation of a V-type windshield.

Figure 2 is an elevational view similar to Figure 1 with the rear glasses removed.

Figure 3 is a horizontal sectional view taken through Figure 1.

Figure 4 is an enlarged fragmentary horizontal sectional view taken through one side of the windshield and the windshield post on the vehicle.

Figure 5 is an enlarged fragmentary top plan view of a front glass showing the heating wire insulator thereon.

Figure 6 is an enlarged fragmentary view of a portion of Figure 1 showing the arrangement of the wires leading from the dual panels of the V-type windshield, wherein electrical heating is supplied to the space between the glasses.

Figure 7 is a view similar to Figure 2 of a single panel type of windshield in accordance with the present invention.

Referring in detail to the drawings, and first to Figures 1 through 6 thereof, illustrating embodiment of the invention in the dual or V-type of windshield, the numerals 5 generally designate the existing windshield posts of the vehicle which substantially in accordance with standard practice are provided with a cut-out portion 6, which is substantially duplicated in the header board over the windshield and in the instrument panel structure under the windshield (not shown), the cut away defining a stop flange 7 which is spacially opposed by a removable windshield trim frame 8 which is secured in place by removable screws or the like 9. The windshield which is generally designated 10 has its edges set in the cut-away 6 with a rubber or other suitable cushioning indicated by the numerals 11 and 12 interposed between the front and the outer edge of the windshield, and with a removable cushion strip 13 disposed between the windshield trim frame 8 and the inner side of the windshield, as indicated in Figure 4 of the drawings. Where there is a central windshield post such as is indicated at 14, the forward part has flanges 7' similar in function to the flanges 7 and the resultant cut outs are similarly lined as indicated by the numeral 15 in Figure 3 with sealing material and in which the inner edges of the windshield panels are set. A removable center trim strip 16 is substantially standard practice to provide retention for the inner sides of the edges of the windshield panels, the engagement of the strip 16 with the panels being cushioned as indicated by the numeral 17, this cushion being removable upon removal of the strip 16.

Each of the two dual panels comprises a forward glass 19 and a rearward glass 20, each of the glasses having a metal, composition or plastic material frame in which the upper and lower and laterally outward edges of the glass are set in cushioning and sealing material indicated by the numeral 22 in Figure 4. The frame of the forward glass 19 is L-shaped in horizontal cross section as seen in Figure 4, with the long arm in a forward transverse position and with the shorter rear arm located to cooperate with the shorter arm of the similarly shaped frame of the inner glass 20, in conjunction with the cushion 23 to act as spacing means for spacing the front and rear glasses apart the desired distance to provide the wanted air space between the glasses. As clearly shown in Figure 4, said frames together with the cushion 23 form a protuberance 18 comprising the spacing means.

The forward glass 19 may be relatively stationarily mounted in the windshield of the vehicle or permanently fixed therein, for instance, by a friction fit, while the rear glass 20 is expressly arranged to be easily removable. Functional connection of the rear glass 20 relative to the forward glass 19 is achieved through the provision of removable screws 24 at suitable intervals around the frames which are threaded through the frame of the rear glass and into the frame of the forward as clearly shown in Figure 4 of the drawings. In view of this arrangement, and whenever it is desired to remove the rear glass from its position relative to the front glass, it is necessary only to remove the removable trim frame 8, the cushion 13, then to turn the screws 24 sufficiently to allow the rear glass to be lifted or pulled rearwardly out of its place.

While a preferred embodiment of the invention has the space 25 between the glasses electrically heated, this is not a necessary arrangement, since the device of the invention will function to a limited extent without heating of the said space.

The heating arrangement contemplated provides spool or other similarly shaped insulated mountings 26 of glass or other suitable material, secured to the back side of the forward glass 19 and arranged at the corners of the glass and at other suitable intervals and around which the heater element wires 27 are trained as indicated in Figure 2 of the drawings. In the case of the dual V-shaped windshield the ends of the wires 27 are brought around insulators 26 at the inner edges of the forward glasses, as indicated in Figures 1, 2 and 6 of the drawings and there severally connected as indicated in Figure 6, to the energizing wires 28 and 29 which are encased in an insulating conduit 30 which leads downwardly through a space provided between the panels and behind the center trim strip 16 and preferably behind the instrument panel (not shown) of the vehicle to connect with a suitable source of electrical energy.

In the form of the invention illustrated in Figure 7, which comprises a single panel windshield involving only two glasses for the full width thereof, the heating element wires 27a are brought out of the windshield at one lower corner thereof to connect with the energizing wires. In this embodiment of the invention a single inner trim frame 8a can be used instead of two such frames substantially necessary in the form of the invention having dual windshield panels each involving a removable rear glass.

Although there are shown and described herein preferred embodiments of the invention, it is to be definitely understood that it is not desired to limit the application of the invention thereto except as may be required by the scope of the subjoined claim.

Having described the invention, what is claimed as new is:

Vehicle windshield construction comprising a windshield frame formed with a windshield accommodating channel, the forward side of the channel defining a stop flange and the rearward side of said channel comprising a removable trim frame, a windshield comprising a panel composed of a front section and a rear section each section containing a windshield glass, means spacing the glasses to define a space therebetween, said front section being frictionally fitted stationarily in said channel next to said stop flange, and securing means exposed by removal of said trim frame for removably securing said rear section to said front section, insulated heater wire mounts fixed on the rear side of said front section, heater wires strung around said mounts to heat said space, said panel comprising marginal frames behind which the said mounts are located whereby said mounts and the heater wires are concealed from view by the marginal frames.

EDWARD W. SLICER.